3,113,834
DENSE SODIUM CARBONATE PROCESS
Brazier K. Beecher and Francis C. Mericola, Wyandotte, Mich., assignors to Wyandotte Chemicals Corporation, Wyandotte, Mich., a corporation of Michigan
Filed Apr. 17, 1961, Ser. No. 103,288
5 Claims. (Cl. 23—63)

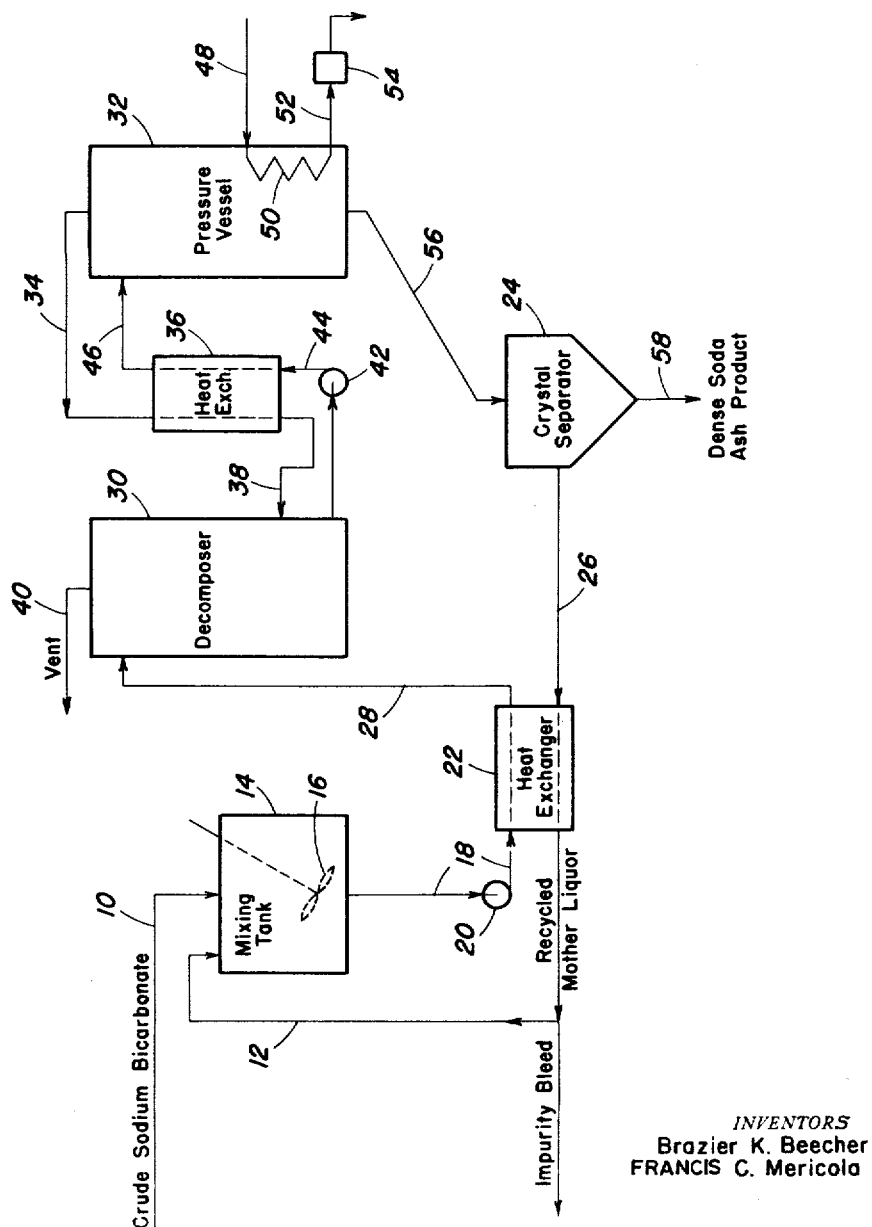

This invention relates to the production of dense soda ash. More particularly, it relates to a process for producing dense crystalline anhydrous soda ash.

In recent years there has been an increasing demand by industry for soda ash of high density and quality. This demand arises from the fact that the so-called "light ash," having a bulk density of around 30 pounds per cubic foot, is fluffy and contains dust-like particles which makes handling a packaging difficult. Also, the glass and steel industries, which consume tremendous quantities of soda ash, desire soda ash of the highest density because furnace yield is a function of the density of the ingredients employed in the charge. It is apparent, therefore, that maximum density is needed to achieve maximum yields.

Soda ash producers using the ammonia-soda process have answered this demand for dense ash in many ways. However, one of the most widely used methods of making dense ash is to add a small amount of water to light ash, thereby forming monohydrated sodium carbonate crystals. The hydrated crystals are then heated to drive off the water. The soda ash resulting from this treatment has a bulk density of about 60 pounds per cubic foot. A disadvantage of this type of process is that the crystals are not uniform in size and shape and are but skeletons of the original crystals, the cavities resulting from the liberation of water and carbon dioxide during calcination. Another approach has been to heat light ash to a temperature where it fuses and then break or grind the sintered ash into small particles. This process is costly and difficult to control for industrial application. Still another approach found in the art is to heat a mixture of light soda ash and water to a temperature above the transition temperature of monohydrated soda ash to anhydrous soda ash and then separate the crystallized anhydrous soda ash. This process is costly and the product does not have a higher density than that achieved by other more inexpensive methods.

At present, practically all commercially available soda ash is manufactured by two basically different methods. The first of these is the ammonia-soda process and the second is from natural trona. The natural trona ash process is presently offering increased competition to the ammonia-soda process because it produces highly quality dense ash at a low cost and, due to its different crystal structure, it has excellent physical properties.

Therefore, it is an object of this invention to prepare dense crystalline soda ash derived from the ammonia-soda process which is resistant to dusting under the conditions encountered in packaging and marketing. It is a further object to prepare dense crystalline soda ash of the highest purity. A still further object is to prepare dense crystalline soda ash of uniform size and shape.

This invention comprises decomposing crude aqueous sodium bicarbonate slurry by heating it to its boiling point while it is under a pressure sufficiently in excess of atmospheric so that the transition temperature of monohydrated sodium carbonate to anhydrous sodium carbonate is lower than the boiling temperature of the crude sodium bicarbonate. The decomposition causes the formation of decomposition gases, such as carbon dioxide and water, which are continuously vented from the vessel and results in the formation of a slurry of crystals of anhydrous sodium carbonate and mother liquor. The anhydrous crystals are then separated from the slurry at a temperature above the transition temperature of monohydrate to anhydrous sodium carbonate and the mother liquor is recycled and mixed with additional crude sodium bicarbonate. Employing this invention, sodium carbonate having a bulk density in excess of 80 pounds per cubic foot has been obtained.

When crude sodium bicarbonate is decomposed under the proper conditions, it passes through a phase where the sodium carbonate, produced from the decomposition, crystallizes in the form of Wegscheider salts of the composition $Na_2CO_3 \cdot 3NaHCO_3$. Upon additional decomposition of the crude sodium bicarbonate these Wegscheider salts go back into solution until another phase region is entered wherein the sodium carbonate, produced by the decomposition, crystallizes as trona

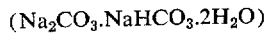
$$(Na_2CO_3 \cdot NaHCO_3 \cdot 2H_2O)$$

Upon still further decomposition the trona crystals go back into solution until the anhydrous sodium carbonate phase is reached. It is in this phase region that the crystals are separated from the slurry. Careful analysis has shown that as crystals are formed in each of the above phase regions the sodium carbonate is purified during the formation, the result being that an exceptionally pure anhydrous sodium carbonate is obtained.

Laboratory analysis has shown that the anhydrous sodium carbonate formed by the method of this invention has an impurity content of less than 10 parts per million of sulfate, 5 parts per million of ammonia, 50 parts per million of insolubles and 100 parts per million of sodium chloride. Another test, commonly employed in the art, to determine the purity of anhydrous sodium carbonate consists of dissolving a certain quantity of sodium carbonate in distilled water, allowing the solution to stand for a few minutes and passing a beam of light through the solution. The light transmission through the solution is measured and is expressed as a percentage of the light that passes through an equivalent amount of distilled water. In utilizing the above test, a 25 weight percent solution of sodium carbonate and distilled water is made up and allowed to stand for twenty minutes prior to passing light through it. The results of numerous such tests reveal a minimum light transmission of 55 percent. In addition to achieving high purity, microscopic examination revealed that the crystals of anhydrous sodium carbonate formed by the method of this invention are of uniform size and shape, the crystal habit being essentially tabular and/or equant.

Further study of the Wegscheider, trona and anhydrous sodium carbonate phase regions has shown that the regions are affected by temperature. At low temperatures, around 100° C., the anhydrous sodium carbonate phase region consists essentially of water and sodium carbonate and very little sodium bicarbonate. At higher temperatures, around 180° C., the anhydrous sodium carbonate phase region encompasses compositions having a much higher concentration of sodium bicarbonate. We have found that if sodium bicarbonate slurry is decomposed at a temperature of about 150° C. it is necessary to decompose better than 90 mol percent of the crude sodium bicarbonate in the mother liquor before the anhydrous phase region is reached and crystals of anhydrous sodium carbonate will form. However, if the decomposition is achieved by heating the sodium bicarbonate at higher temperatures, then much less of the sodium bicarbonate need be decomposed before the anhydrous sodium carbonate phase region is reached.

For example, if the decomposition is carried out at about 225° C., the anhydrous sodium carbonate phase region will be reached when about 55 mol percent of the sodium bicarbonate in the mother liquor is decomposed. Thus it is apparent that there is a great latitude as to the conditions employed in this invention. Economic considerations will determine the answer to the question of whether (1) it is more profitable to decompose at a high temperature but with the advantage of not having to decompose as much of the crude sodium bicarbonate, or whether (2) it is more profitable to decompose at a low temperature with the disadvantage of having to decompose a higher percentage of the crude sodium bicarbonate. However, it has been determined that it is not practical to produce crystalline anhydrous ash, by the method of this invention, below a temperature of about 150° C. because of the difficulty of decomposing a sufficient mol percentage of the sodium bicarbonate to reach the anhydrous sodium carbonate phase region. Nor would it be practical to decompose at a temperature above 250° C. due to the enormous heat energy that would be required to heat the sodium bicarbonate slurry.

While it is quite possible by the method of this invention to mix crude sodium bicarbonate and recycled mother liquor, decompose the mixture and recover the anhydrous sodium carbonate in a single vessel, it is preferable to carry out the mixing, decomposing and separation in separate vessels thereby permitting greater control of the process. A preferred mode of operation for carrying out the descibed process on a commercial scale is illustrated diagrammatically in the accompanying drawing. Crude sodium bicarbonate and recycled mother liquor are passed into a mixing tank 14 through lines 10 and 12, respectively, where they are intimately mixed by the use of a stirrer 16. Line 12 is equipped with a discharge conduit whereby impurities built up in the course of the process can be separated from the mother liquor. The mixture is passed via line 18 and pump 20 through a heat exchanger 22 where it is heated by the mother liquor which is being recycled from a crystal separator 24 and passed into the heat exchanger 22 via line 26. The crude sodium bicarbonate mixture is passed from heat exchanger 22 to a decomposer 30 via line 28.

The heat for the decomposition of crude sodium bicarbonate taking place in decomposer 30 is supplied by water and carbon dioxide resulting from further decomposition which is done in pressure vessel 32. The water and carbon dioxide leaving pressure vessel 32 via line 34 pass through a heat exchanger 36 and enter the decomposer via line 38. Water, ammonia and carbon dioxide are vented from decomposer 30 through line 40. The partially decomposed mixture is passed from decomposer 30 via line 44 and pump 42 through heat exchanger 36 where it is heated by the water and carbon dioxide from pressure vessel 32, and via line 46 into pressure vessel 32. In the pressure vessel 32 the mixture is further decomposed until the mixture is in the phase where crystalline anhydrous sodium carbonate is formed. Heat is supplied to the pressure vessel by steam which enters the vessel via line 48, circulates through coils 50 and is returned to a steam condensate trap 54 via line 52. The resulting slurry of crystalline anhydrous sodium carbonate and mother liquor is passed into a crystal separator 24 via line 56. The sodium carbonate having a moisture content of 2 to 12 percent water is withdrawn via line 58 and flash dried.

In producing dense crystalline anhydrous sodium carbonate by the method of this invention it is necessary to heat the sodium bicarbonate slurry in the pressure vessel 32 to a temperature in the range of about 150° C. to about 250° C. As was stated earlier, the reason for this is that it is difficult, at a temperature below about 150° C., to decompose a sufficient mol percentage of the sodium bicarbonate to reach the anhydrous sodium carbonate phase region. Likewise, economic considerations preclude heating the sodium bicarbonate to a temperature in excess of 250° C. The preferred temperature range to which the sodium bicarbonate is heated in the pressure vessel 32 is from about 190° C. to about 225° C.

The pressure employed in the pressure vessel 32 is determined by the temperature to which the sodium bicarbonate is heated in the pressure vessel 32 and the mol percent of sodium bicarbonate decomposed. Since the sodium bicarbonate in the mother liquor must be decomposed to a minimum of 55 mol percent when it leaves the pressure vessel the pressure will be in the range of about 80 p.s.i.a. to about 500 p.s.i.a. In the operation of the pressure vessel there are essentially three variables: temperature, pressure and degree of decomposition. By selecting two of the three, the third is also determined. As stated earlier, the anhydrous sodium carbonate phase region is reached when about 55 mol percent of the sodium bicarbonate is decomposed at a temperature of about 225° C. However, it has been found that a much superior crystal is formed if the crystal nuclei are formed well within the anhydrous phase region, hence, it is desirable to decompose about 70 mol percent of the sodium bicarbonate. Accordingly, the preferred pressure range in the pressure vessel is about 300 p.s.i.a. to about 450 p.s.i.a.

In the preferred embodiment of this invention the decomposition of crude sodium bicarbonate is carried out in two separate vessels although a greater number could be used. The primary reasons for the use of two vessels are to achieve a greater degree of control and to minimize the heat requirements. It will be noted that heat from a source outside the system need only be supplied to the pressure vessel 32. The water and carbon dioxide driven off by the decomposition in the pressure vessel 32 supplied the heat energy for the decomposition in the decomposer 30. A second and even more important reason is that when the pressure vessel is operated at high temperature and pressure a greater quantity of steam is required to decompose a pound of sodium bicarbonate. Therefore, it is desirable to do much of the decomposing of the sodium bicarbonate in a vessel operating at a lower temperature and pressure than that used in the pressure vessel. To achieve good efficiency, the sodium bicarbonate should be decomposed to a minimum of about 20 mol percent in the decomposer 30. In the preferred method of operation the sodium bicarbonate slurry is heated in the decomposer 30 until the sodium bicarbonate is about 40 mol percent decomposed. It is then passed into the pressure vessel 32 and heated so that on leaving thep ressure vessel 32, the sodium bicarbonate leaving the pressure vessel 32, the sodium bicarbonate in the mother liquor is about 70 mol percent decomposed. is heated to a temperature of from about 100° C. to about 190° C. in the decomposer 30. It has been found that at temperatures below 100° C. it is difficult to decompose sodium bicarbonate while if the sodium bicarbonate was heated above 190° C. then another source of heat energy had to be supplied to the decomposer in addition to the off-gases from the pressure vessel 32 thereby making the process less economical. The preferred temperature range to which the sodium bicarbonate is heated in the decomposer 30 is from about 150° C. to about 190° C.

The decomposer 30 can be operated at below atmospheric, atmospheric, or superatmospheric pressure. Because of economic considerations, however, a pressure from about atmospheric to about 225 p.s.i.a. is preferred. Still more preferred is a pressure range of about 80 p.s.i.a. to about 225 p.s.i.a. It should also be pointed out that there is an advantage in operating the decomposer 30 at above atmospheric pressure in that the carbon dioxide liberated in the decomposer 30 can be returned to the ammonia-soda process without the need for additional compression While the temperature and pressure limitations under which this invention can be carried out offer a wide degree of latitude in the selection of operating conditions it must be remembered that it is necessary that the pressure vessel 32 be operated at a pressure high enough to insure that the transition temperature of monohydrated sodium carbonate to anhydrous sodium carbonate is lower than the temperature at which the decomposition of the crude sodium bicarbonate is being carried out. This precaution insures that sodium carbonate crystallizes directly as the dense anhydrous form and not in the skeleton crystal structure of monohydrate. To preclude any possibility of the sodium carbonate recrystallizing as monohydrate during the process of separating the anhydrous sodium carbonate from the mother liquor the crystal separator is also operated under a temperature and pressure sufficient to maintain the sodium carbonate in the anhydrous phase. Preferably, the crystallizer will be operated at a temperature of about 150 to about 225° C. and at a pressure of about 175 p.s.i.a to about 400 p.s.i.a.

The following examples are provided so as to more clearly illustrate the method of this invention to those skilled in the art and they should not be employed to unduly restrict the invention as disclosed and claimed herein. The product obtained in the following two examples has a bulk density in excess of 80 pounds per cubic foot.

*Example 1*

Employing the equipment illustrated in the drawing, 3780 pounds of crude sodium bicarbonate manufactured by the ammonia-soda process and at a temperature of about 30° C. are mixed with 4000 pounds of recycled mother liquor at essentially atmospheric pressure and a temperature of about 150° C. The 3780 pounds of crude sodium bicarbonate consists of 3170 pounds of sodium bicarbonate, 140 pounds of ammonium bicarbonate and 470 pounds of water. The recycled mother liquor consists of 2720 pounds of water, 880 pounds of sodium carbonate and 400 pounds of sodium bicarbonate. This mixture is pumped at about 100° C. to the decomposer which is operated at a temperature of about 150° C. and a pressure from about 80 to 90 p.s.i.a. About a 70 mol percent decomposition of the sodium bicarbonate takes place within the decomposer. This partially decomposed slurry is then pumped into a pressure vessel operating at a temperature of about 170° C. and a pressure of about 110 to 120 p.s.i.a. where further decomposition of the sodium bicarbonate takes place resulting in a total decomposition of 92 mol percent. The carbon dioxide and water liberated during the decomposition in the pressure vessel is cycled to the decomposer where it serves as the heat source for the decomposition therein. The carbon dioxide, ammonia and water liberated in the decomposer is vented off for reuse in the ammonia-soda process.

The slurry in the pressure vessel, comprising crystals of anhydrous sodium carbonate and mother liquor, is passed to a centrifuge operating at a pressure of about 180 to 190 p.s.i.a. wherein the crystals of anhydrous sodium carbonate are separated from the mother liquor and the mother liquor recycled to the mixing tank. In this example, about 2000 pounds of anhydrous sodium carbonate were produced.

*Example 2*

This example is based on the equipment and flow scheme as shown in the drawing. 91.1 tons per hour of crude sodium bicarbonate manufactured by the ammonia-soda process at a temperature of about 30° C. is fed by a screw conveyor into a low pressure (24–40 p.s.i.a.) agitated vessel where it is mixed with about 87.4 tons per hour of recycled mother liquor and 11.1 tons per hour of water. The recycled mother liquor and water have a temperature of about 120° C. and 90° C. respectively entering the mixing vessel. The compositions of crude sodium bicarbonate and recycled mother liquor are as follows:

| | Crude Sodium bicarbonate, t./hr. | | Recycled Mother Liquor, t./hr. |
|---|---|---|---|
| $NaHCO_3$ | 79.3 | $NaHCO_3$ | 10.5 |
| $H_2O$ | 11.4 | $Na_2CO_3$ | 15.7 |

The resulting slurry, at a temperature of about 90 to 110° C., is pumped through a heat exchanger wherein the slurry is heated by exchange with the clear recycled mother liquor coming from the crystal separator. During this heating process the salts in the crude slurry become more soluble and no fouling should occur on the heat exchanger surfaces. Similarly, the salts dissolved in the clear recycled mother liquor become more soluble as the solution cools and no precipitation should occur in this stream at temperatures above 90° to 110° C. From the heat exchanger the slurry is passed into the decomposer which is a bubble plate tower operating at a pressure of about 225 p.s.i.a. and a temperature of about 190° C. The heat for this unit is supplied by 36.7 tons per hour steam and 12.3 tons per hour carbon dioxide liberated during further decompositoin in the pressure vessel. Within the decomposer the crude sodium bicarbonate is partially decomposed to form a solution in equilibrium with sodium sesquicarbonate ($NaHCO_3 \cdot Na_2CO_3 \cdot 2H_2O$) and the resulting vapor phase. During this partial decomposition 19.7 tons per hour of carbon dioxide and 8.2 tons per hour of water are expelled from the decomposer and collected for reuse in the ammonia-soda process. The partially decomposed slurry is comprised of 33.6 tons per hour of sodium carbonate, 61.4 tons per hour of sodium bicarbonate and 115.6 tons per hour of water. This slurry is passed through a heat exchanger where it is heated by the carbon dioxide and steam expelled from the pressure vessel and into the pressure vessel which is operated at a pressure of about 400 p.s.i.a. and a temperature of about 225° C. Within the pressure vessel the slurry is further decomposed to produce a solution (70% decomposed) in equilibrium with anhydrous ash and an equilibrium vapor consisting of 12% carbon dioxide and 88% water. The heat is supplied to the pressure vessel by 440 p.s.i.a. steam. The anhydrous ash slurry from the pressure vessel is passed to a centrifuge wherein the dense anhydrous sodium carbonate is separated from the mother liquor. The dense anhydrous sodium carbonate represents 41.7 tons per hour and the mother liquor 87.4 tons per hour.

It should be apparent that the objectives of this invention have been attained. Broadly speaking, a new and improved method of preparing high density anhydrous sodium carbonate has been provided which comprises the direct precipitation of anhydrous ash out of a slurry of crude sodium bicarbonate decomposed at high temperatures and pressures.

We claim:

1. A cyclic method of forming dense soda ash which comprises mixing crude sodium bicarbonate with recycled mother liquor to produce a crude sodium bicarbonate slurry, passing said slurry into a closed decomposition vessel wherein said slurry is heated to a temperature of about 100° C. to about 250° C. and at superatmospheric pressure, continuing said heating until the sodium bicarbonate is decomposed to a minimum of about 20 mol percent to produce a partially decomposed sodium bicarbonate slurry and decomposition gases, removing said decomposition gases from the decomposer and passing said partially decomposed slurry into a pressure vessel and heating said slurry therein to a temperature of about 150° C. to about 250° C. at a pressure from about 80 p.s.i.a. to about 500 p.s.i.a., continuing said heating until a minimum of 55 mol percent of the sodium bicarbonate has been decomposed to produce decomposition gases and a mixture of anhydrous sodium carbonate crystals and mother liquor, removing said decomposition gases from the decomposition vessel and separating the anhydrous sodium carbonate from the mother liquor at a temperature above the transition temperature of monohydrated sodium carbonate to anhydrous sodium carbonate, recycling the mother liquor and mixing it with additional crude sodium bicarbonate.

2. A cyclic method of forming dense soda ash which comprises mixing crude sodium bicarbonate with recycled mother liquor to produce a crude sodium bicarbonate slurry, passing said crude sodium bicarbonate slurry into a closed decomposition vessel and heating said crude sodium bicarbonate slurry to a temperature of about 150° C. to about 190° C. at a pressure from about 80 p.s.i.a. to about 225 p.s.i.a. until about 40 mol percent of the sodium bicarbonate is decomposed so as to produce a partially decomposed sodium bicarbonate slurry and decomposition gases, removing said decomposition gases from the decomposition vessel and passing said partially decomposed sodium bicarbonate slurry to a pressure vessel and heating said slurry therein to a temperature of about 190° C. to about 225° C. at a pressure from about 300 p.s.i.a. to about 450 p.s.i.a., continuing said heating until the sodium bicarbonate is decomposed to a minimum of 70 mol percent to produce decomposition gases and a slurry of anhydrous sodium carbonate crystals and mother liquor, removing the decomposition gases from the pressure vessel and passing said gases into the decomposer thereby heating the decomposer, passing the slurry of sodium carbonate crystals and mother liquor into a crystal separator and separating the anhydrous sodium carbonate crystals from the mother liquor at a temperature of about 150° C. to about 225° C. and at a pressure of about 175 p.s.i.a. to about 400 p.s.i.a., recycling the mother liquor and mixing it with additional crude sodium bicarbonate.

3. A cyclic method of forming dense soda ash which comprises mixing crude sodium bicarbonate with recycled mother liquor to produce a crude sodium bicarbonate slurry, passing said slurry into a closed decomposition vessel wherein said slurry is heated to a temperature of about 100° C. to about 190° C. at a pressure from about atmospheric to about 225 p.s.i.a. so as to produce a partially decomposed sodium bicarbonate slurry and decomposition gases, removing said decomposition gases from the decomposer and passing said partially decomposed slurry into a pressure vessel and heating said slurry therein to a temperature of about 150° C. to about 250° C. at a pressure from about 80 p.s.i.a. to about 500 p.s.i.a., continuing said heating until a minimum of 55 mol percent of the sodium bicarbonate has been decomposed to produce decomposition gases and a mixture of anhydrous sodium carbonate crystals and mother liquor, removing said decomposition gases from the decomposition vessel and separating the anhydrous sodium carbonate from the mother liquor at a temperature above the transition temperature of monohydrated sodium carbonate to anhydrous sodium carbonate, recycling the mother liquor and mixing it with additional crude sodium bicarbonate.

4. A cyclic method of forming dense soda ash which comprises mixing crude sodium bicarbonate with recycled mother liquor to produce a crude sodium bicarbonate slurry, passing said slurry into a closed decomposition vessel wherein said slurry is heated to a temperature of about 150° C. to about 190° C. at a pressure from about 80 p.s.i.a. to about 225 p.s.i.a., continuing said heating until the sodium bicarbonate is decomposed to a minimum of about 20 mol percent to produce a partially decomposed sodium bicarbonate slurry and decomposition gases, removing said decomposition gases from the decomposer and passing said partially decomposed slurry into a pressure vessel and heating said slurry therein to a temperature of about 190° C. to about 225° C. at a pressure from about 300 p.s.i.a., to about 450 p.s.i.a., continuing said heating until a minimum of 55 mol percent of the sodium bicarbonate has been decomposed to produce decomposition gases and a mixture of anhydrous sodium carbonate crystals and mother liquor, removing said decomposition gases from the decomposition vessel and separating the anhydrous sodium carbonate from the mother liquor at a temperature above the transition temperature of monohydrated sodium carbonate to anhydrous sodium carbonate, recycling the mother liquor and mixing it with additional crude sodium bicarbonate.

5. A cyclic method of forming dense soda ash which comprises mixing crude sodium bicarbonate and recycled mother liquor to produce an aqueous crude sodium bicarbonate slurry, heating said slurry to a temperature of about 190° C. at a pressure of about 225 p.s.i.a., continuing said heating until the sodium bicarbonate is decomposed to a minimum of about 40 mol percent to produce a partially decomposed sodium bicarbonate slurry and decomposition gases, removing said decomposition gases from the decomposition vessel and passing said slurry into a pressure vessel and heating said slurry to a temperature of about 225° C. at a pressure of about 450 p.s.i.a., continuing said heating until a minimum of 70 mol percent of the sodium bicarbonate has been decomposed to produce decomposition gases and a mixture of anhydrous sodium carbonate crystals and mother liquor, removing said decomposition gases from the pressure vessel and passing the slurry of anhydrous sodium carbonate crystals and mother liquor into a crystal separator at a pressure of about 175 p.s.i.a. to about 400 p.s.i.a. and a temperature of about 150 to about 225° C. and separating therein anhydrous sodium carbonate crystals from said slurry and recycling the resulting slurry as mother liquor and mixing it with additional crude sodium bicarbonate.

References Cited in the file of this patent
UNITED STATES PATENTS

| 1,907,987 | Lynn | May 9, 1933 |
| 2,267,136 | Robertson | Dec. 23, 1941 |

UNITED STATES PATENT OFFICE
CERTIFICATE OF CORRECTION

Patent No. 3,113,834                     December 10, 1963

Brazier K. Beecher et al.

It is hereby certified that error appears in the above numbered patent requiring correction and that the said Letters Patent should read as corrected below.

Column 1, line 17, for "a" read -- and --; line 51, for "highly" read -- high --; column 3, line 42, for "descibed" read -- described --; column 4, line 64, strike out "leaving thep ressure vessel 32, the sodium bicarbonate"; line 66, after "decomposed." insert -- Satisfactory results are obtained if the sodium bicarbonate --; column 5, line 8, for "225 p.s.i.a" read -- 225 p.s.i.a. --; line 13, after "compression" insert a period; line 33, for "175 p.s.i.a" read -- 175 p.s.i.a. --; column 6, line 38, for "decompositoin" read -- decomposition --; column 7, line 34, for "to" read -- into --.

Signed and sealed this 19th day of May 1964.

(SEAL)
Attest:

ERNEST W. SWIDER
Attesting Officer

EDWARD J. BRENNER
Commissioner of Patents